July 31, 1923.

A. L. JOHNSTON, JR

WIRE CHAIN LINK

Filed June 11, 1920

1,463,281

Inventor
A. Langstaff Johnston Jr.
by Wilkinson & Giusta.
Attorneys.

Patented July 31, 1923.

1,463,281

UNITED STATES PATENT OFFICE.

ANDREW LANGSTAFF JOHNSTON, JR., OF RICHMOND, VIRGINIA, ASSIGNOR, BY MESNE ASSIGNMENTS, TO OFF'N'ON CHAIN CORPORATION, OF NEW YORK, N. Y., A CORPORATION OF DELAWARE.

WIRE CHAIN LINK.

Application filed June 11, 1920. Serial No. 388,287.

*To all whom it may concern:*

Be it known that I, ANDREW LANGSTAFF JOHNSTON, Jr., a citizen of the United States, residing at Richmond, in the county of Henrico and State of Virginia, have invented certain new and useful Improvements in Wire Chain Links; and I do hereby declare the following to be a full, clear, and exact description of the invention, such as will enable others skilled in the art to which it appertains to make and use the same.

The present invention relates to improvements in wire chain links. An object of the invention is to provide a neat and compact chain in which the links will be so formed as to avoid the exposing of free ends, which are found objectionable in present forms of chains in that they are apt to hook in or rub against adjacent surfaces, and often causing damage or accidents thereby.

A further object of the invention resides in providing a simple and inexpensive chain having links composed in part of eyes bent in a peculiar manner, with the free ends of the links abutting against opposite portions to avoid the exposure thereof.

In the accompanying drawings forming a part of this specification, and in which similar reference symbols indicate corresponding parts in the several views.

Figure 1:
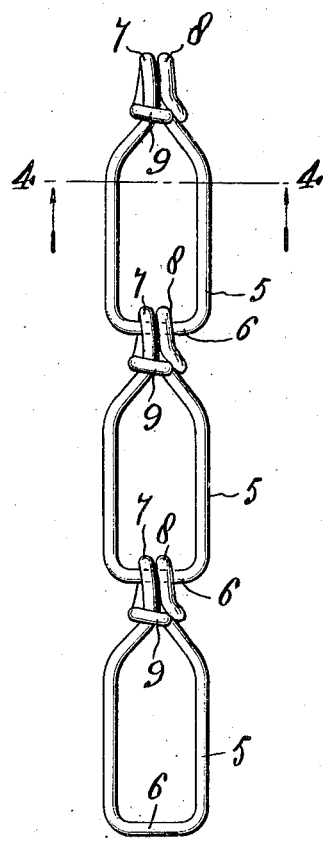
Figure 1 is a plan view of a portion of a chain constructed in accordance with the present invention.
Figure 2:
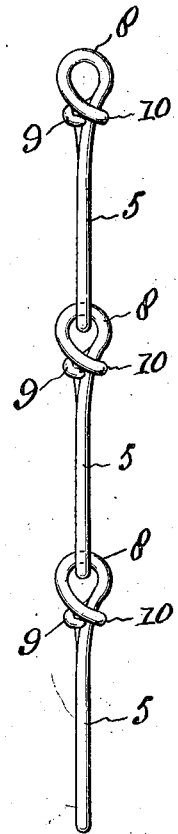
Figure 2 is an edge view thereof.
Figure 3:
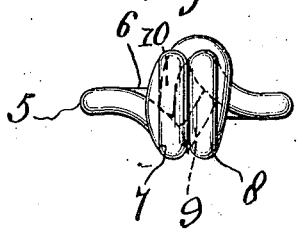
Figure 3 is an end view of one of the links.

As exemplified in the form illustrated in the drawings the invention consists more particularly in the formation of the eyes of each link, which eyes form the means of attachment to adjacent links. A portion of one of the said chains is shown in Figures 1 and 2, and is composed of three links. Each such link 5 is manufactured from suitable chain metal having a round or other cross section and bent in a substantially rectangular formation, with the intermediate portion of the link arranged transversely or at right angles to the longitudinal axis of said link, providing a cross bar 6 to which the eyes of an adjacent link are connected.

The opposite end of each link is formed into a pair of eyes 7 and 8 by looping the free ends of the link. According to the illustrative form of the invention the eyes 7 and 8 are formed by looping the free ends of the link in opposite directions. This enables the end portions 9 and 10 to be bent around transversely of the link near the base portions of the eyes at the region where the eyes merge with the side strands of the link, both ends 9 and 10 being bent around in the same direction and terminating adjacent the opposite strands at points lying within the outer surfaces of the eyes.

Figure 4:
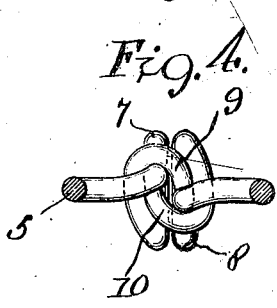
Figure 4 is a sectional view taken on the line 4—4 in Figure 1.

The manner of bending over the extremities 9 and 10 is most clearly seen in Figure 4.

The extremities which, in other types of chains form objectionable hook ends which are prone to catch upon foreign material that may be brought in contact with them, are thus protected from outside interference. The extremities are also prevented from contacting with objects by the close position they are made to assume with reference to the initial portions of said eyes 7 and 8.

An additional advantage derived from the formation just described, lies in the neat and compact appearance of the chain and in the increased strength obtained from the construction which admits of the inner faces of the eyes 7 and 8 being allowed to come in contact. The one eye, therefore, reinforces the other, and the tendency of the eyes to be bent out of alinement is avoided.

An additional consideration is that the extremities 9 and 10 afford stops for limiting the movement of the eyes in one edgewise direction, which facilitates the alining of such eyes.

It will be observed that the new construction is obtained without the use of any further parts than are at present employed in chains having the objections noted, and that the invention resides in the simple arrangement of the eyes and the extremities of the chain links.

It is obvious that those skilled in the art may vary the details of construction and arrangements of parts without departing from the spirit of my invention, and therefore I do not wish to be limited to such features except as may be required by the claims.

I claim:

1. A chain link made of an integral length of stock having its free ends terminating in adjacent eyes, the stock forming said eyes being bent over in opposite directions, the end portions of the stock being bent transversely of the link adjacent the base of the eyes and terminating inwardly of the outside faces thereof with their extremities protected by said eyes and the inside faces of the eyes being in close contact throughout.

2. A chain link made of a single bent piece of wire having its free ends terminating in eyes, the portions of wire forming said eyes being bent over in opposite directions, the extremities of the wire lying inwardly of the outside faces of the eyes, and being protected by such eyes, and the inside faces of said eyes being in close contact throughout, and the free ends of said wire abutting the body portion of the link.

3. A chain link made of an integral length of stock formed into a loop having side strands, the ends of the stock being shaped to form eyes lying side by side for the reception of an adjacent link, each of said ends being bent in the same direction around the respective side strands and terminating wholly within the planes of the outer surfaces of said eyes and being protected by said eyes and the adjacent strand.

ANDREW LANGSTAFF JOHNSTON, Jr.